United States Patent
Enlund et al.

[11] Patent Number: 5,806,616
[45] Date of Patent: Sep. 15, 1998

[54] ARRANGEMENT IN A ROCK DRILLING EQUIPMENT

[75] Inventors: Pentti Enlund; Juha Piipponen; Jouko Kuisma; Seppo Peltola, all of Tampere, Finland

[73] Assignee: Tamrock Oy, Finland

[21] Appl. No.: 578,692

[22] PCT Filed: Jun. 29, 1994

[86] PCT No.: PCT/FI94/00297

§ 371 Date: Dec. 27, 1995

§ 102(e) Date: Dec. 27, 1995

[87] PCT Pub. No.: WO95/01496

PCT Pub. Date: Jan. 12, 1995

[30] Foreign Application Priority Data

Jun. 30, 1993 [FI] Finland .................................. 933020

[51] Int. Cl.⁶ .................................................. B62D 55/116
[52] U.S. Cl. ..................... 180/9.52; 280/6.11; 280/755
[58] Field of Search .......................... 180/9.5, 9.1, 9.52, 180/418; 280/6.11, 840, 111, 104, 715, 755; 91/420

[56] References Cited

U.S. PATENT DOCUMENTS

| | | | |
|---|---|---|---|
| 3,012,624 | 12/1961 | Lich ........................................ | 180/9.5 |
| 3,972,557 | 8/1976 | Hudston et al. ........................ | 91/420 |
| 3,990,583 | 11/1976 | Nishida et al. ......................... | 91/420 |
| 4,046,209 | 9/1977 | LaCasse .................................. | 180/9.52 |
| 4,341,149 | 7/1982 | Dezelan .................................. | 91/420 |
| 4,606,551 | 8/1986 | Toti et al. ............................... | 280/6.11 |
| 4,614,148 | 9/1986 | Bates ...................................... | 91/420 |

*Primary Examiner*—Brian L. Johnson
*Assistant Examiner*—Avraham Lerner
*Attorney, Agent, or Firm*—Nixon & Vanderhye P.C.

[57] ABSTRACT

An arrangement for controlling the oscillation of a rock drilling equipment, comprising oscillation cylinders acting between a body and two crawlers, an oscillation selector valve allowing the oscillation cylinders to be interconnected. Locking valves are mounted in the oscillation cylinders, which valves prevent the flow of pressure fluid from the oscillation cylinders e.g., in the case of a hose damage, thus locking the crawlers and the body against movement relative to each other.

9 Claims, 3 Drawing Sheets

ARRANGEMENT IN A ROCK DRILLING EQUIPMENT

TECHNICAL FIELD

The invention relates to an arrangement in a rock drilling equipment for controlling oscillation, comprising oscillation cylinders acting between a body and two crawlers, respectively, an oscillation selector valve allowing the oscillation cylinders to be interconnected during the drive of the equipment so that when one cylinder is extended the other cylinder is contracted, and vice versa.

BACKGROUND

In a crawler-base rock drilling equipment, each crawler is connected to the equipment body by an oscillation cylinder positioned between the crawler frame and the body and a transverse turning axle allowing the crawler to turn with respect to the equipment in accordance with the irregularities of the underlying surface. In order that the equipment would move more evenly in the terrain and would load the body to a lesser extent, the oscillation cylinders are interconnected during normal drive in such a way that when the other crawler turns in one direction with respect to the equipment, the other crawler has to turn correspondingly in the opposite direction, and so the equipment will stay in balance. A drawback of the prior art is, however, that the cylinders have to be interconnected by hoses in order that the equipment could operate, the cylinders could move and the crawlers turn. When a hose is damaged for one reason or another, the pressure escapes from the oscillation cylinders and there is the danger that the equipment may fall over.

SUMMARY OF THE INVENTION

The object of the present invention is to provide an arrangement by means of which the balance of the equipment can be controlled easily and reliably in as many situations as possible. The arrangement according to the invention is characterized in that it comprises locking valves mounted in the oscillation cylinders, said valves being connected to hydraulic lines for the oscillation cylinders such that the flow of pressure fluid out of the oscillation cylinders through the hydraulic lines is normally blocked, and that the locking valves comprise guide means, which release the flow of pressure fluid in the hydraulic lines of the cylinders by a pressure applied to the locking valves. An essential feature of the invention is that the locking valves are mounted in the oscillation cylinders, and connected to the hydraulic lines of the oscillation cylinders such that the hydraulic lines are normally closed, whereby the oscillation cylinders are fixed in the position in which they are. Another essential feature of the invention is that the locking valves are controllable by an external separate pressure, so that they can be e.g. opened automatically while driving the equipment onwards by taking the control pressure from a line which is pressurized during drive. Still another essential feature of the invention is that, if required, the oscillation may be locked out e.g. when the drilling boom or the upper carriage of the equipment turns outwards from the longitudinal direction of the equipment through a predetermined angle. In this way, the risk of falling caused by changes in balance can be avoided.

An advantage of the arrangement according to the invention is that when the hoses between the oscillation cylinders are damaged, the control pressure of the valve may be guided directly into the tank, for instance, and the valves are closed, fixing the cylinders in position so that the crawlers will be locked stationary with respect to the body of the equipment. Further, the equipment is constantly safe as the oscillation is opened only during drive and it need not always be paid attention to separately. Moreover, the invention provides extra safety in that the oscillation can be easily locked out in unusual conditions, and the locking out can be automated by utilizing sensors connected to the turning mechanism of the boom or the upper carriage.

The invention will be described more fully with reference to the attached drawings.

DETAILED DESCRIPTION OF THE DRAWINGS

Figure 1:
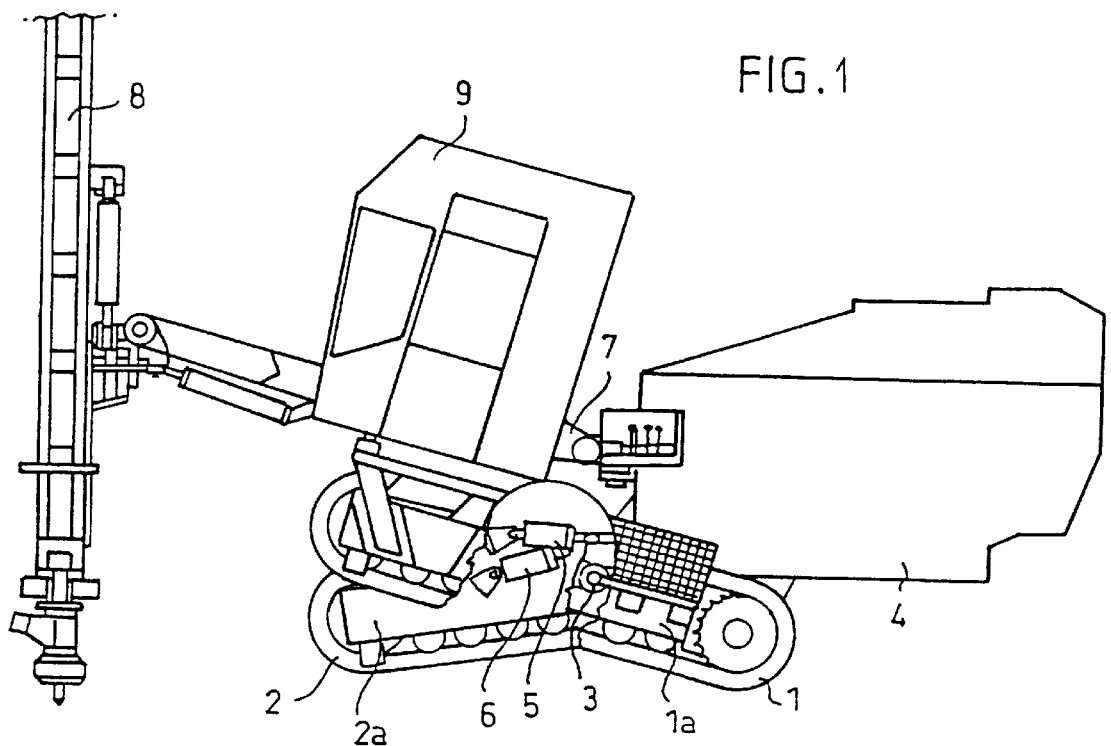
FIG. 1 is a schematic side view of a rock drilling equipment in a partial section.

FIG. 1 shows a rock drilling equipment comprising crawlers 1 and 2 connected pivotally about an axis 3 with respect to a body 4. The body 4 comprises all required power means, control means, etc., which as such are well-known, and therefore they and their operation will not be described more closely. An oscillation cylinder 5 and 6 is provided between frames 1a and 2a for each crawler, respectively, and the body 4. The oscillation cylinders act between the body and the crawlers so that the body will not tilt over about the axis 3. A boom 7 is further attached to the body, and a feeding beam 8 is attached to the end of the boom. The structures and operations of the boom and the feeding beam are well-known and less relevant to the invention, wherefore their operation will not be described more closely herein. The equipment shown in FIG. 1 further comprises a cabin 9 connected to the frame of the crawler 1 such that it moves together with the crawler when the crawler pivots about the axis 3. Generally speaking, this kind of cabin is not necessary and it is not essential to the invention. As a matter of fact, the invention may be applied in all kind of equipment comprising two crawlers similarly pivotable about a horizontal axis apart from each other. In the figures to be described below, no components unessential to the invention, such as the boom 7, the feeding beam 8, and the cabin 9, have been shown for the sake of clarity unless it is necessary for the understanding of the invention.

Figure 2A:
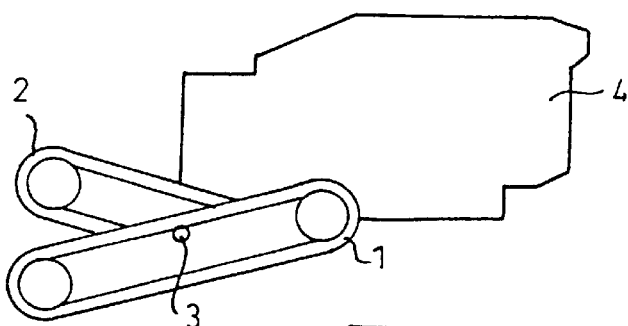
FIGS. 2a to 2c illustrate schematically the oscillation of the rock drilling equipment.
Figure 2B:
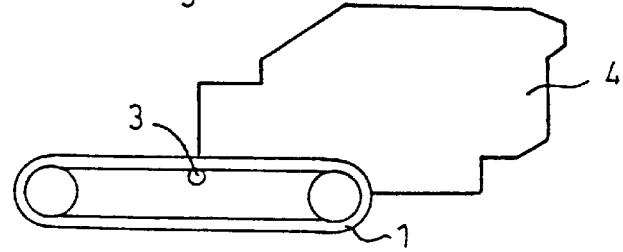
Figure 2C:
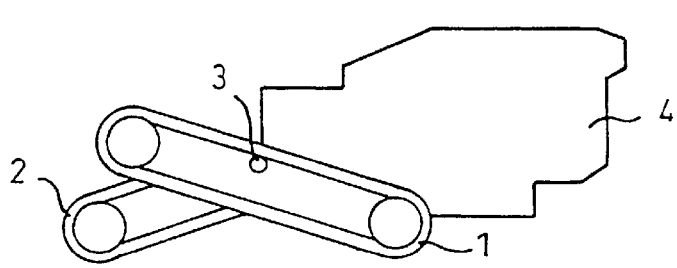

FIGS. 2a to 2c illustrate schematically the principle of the oscillation operation. In all of the figures, the body 4 is shown only partially in a substantially horizontal position, and the crawlers 1 and 2 are shown in different positions according to the situation. In FIG. 2a, the crawler 1 is in a downwardly turned position due to the terrain conditions, whereby the crawler 2 is correspondingly in an upwardly turned position. In FIG. 2b, both of the crawlers are on a substantially even surface, and are thus parallel to each other. In FIG. 2c, in turn, the situation is the opposite of that of FIG. 2a, whereby the crawler 1 is on a rising surface and the crawler 2 is correspondingly on a falling surface.

Figure 3:
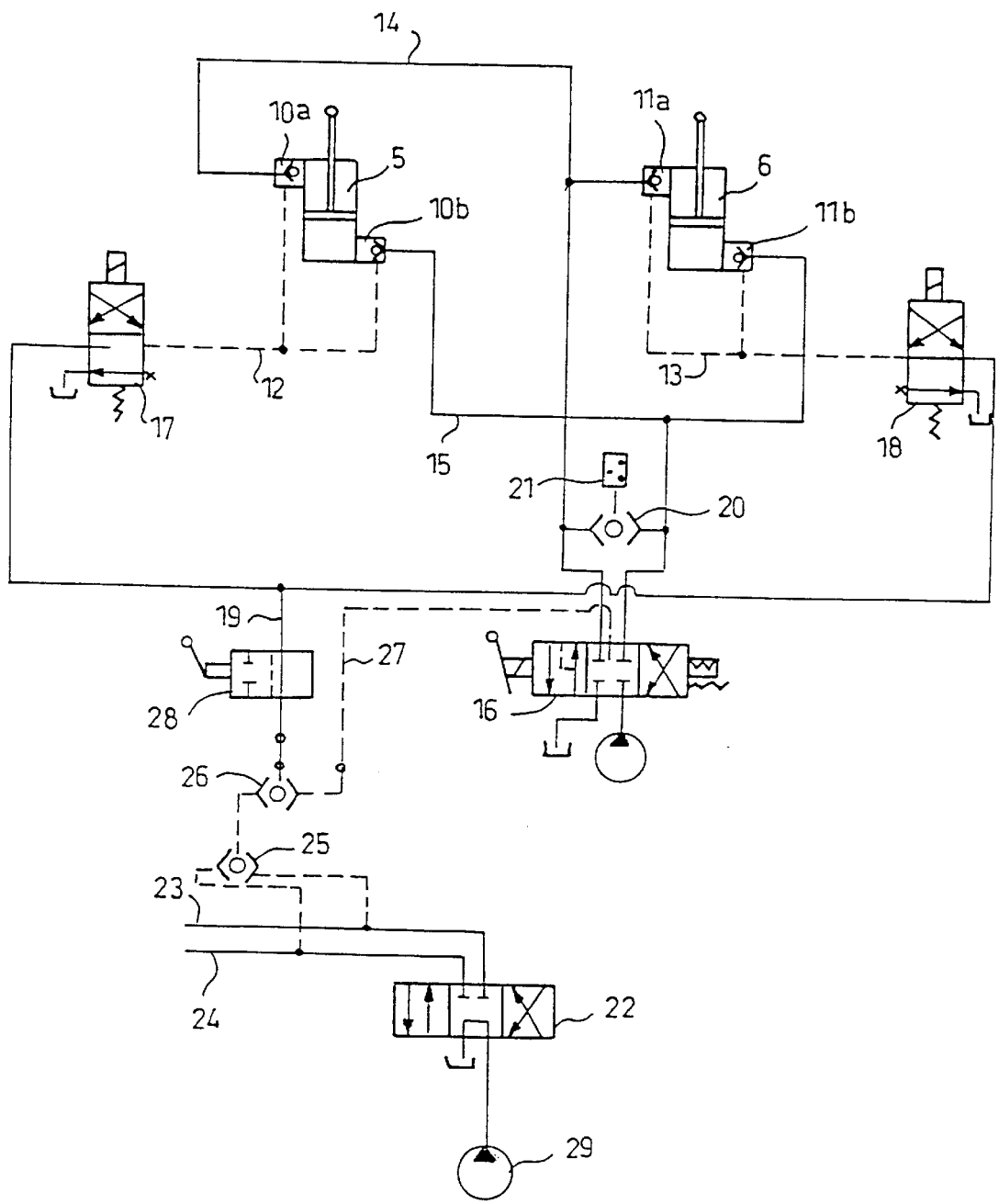
FIG. 3 illustrates schematically an arrangement according to the invention for connecting oscillation cylinders.

FIG. 3 shows schematically an arrangement, where the oscillation hydraulics of the drilling equipment is connected so as to achieve the operation according to the invention. The figure shows pressure-controlled non-return valves i.e. locking valves 10a, 10b and 11a, 11b mounted in connection with the oscillation cylinders 5 and 6. Hydraulic lines to the cylinder spaces of the cylinders 5 and 6 pass through the locking valves. Pressure fluid connections between the locking valve 10a, 10b and 11a, 11b and the oscillation cylinders 5 and 6, respectively, are realized as fixed, rigid pipes or as fixed lines in order to prevent hose damage between them. The operation of the locking valves 10a, 10b and 11a, 11b is based on the fact that they are openable for operation merely by an external pressure through control lines 12 and 13. Accordingly, if no pressure is supplied to the control lines, the locking valves 10a, 10b and 11a, 11b remain closed, and the cylinders 5 and 6 remain locked in the positions where they were when the locking valves were closed the preceding time. Hydraulic lines 14 and 15 are provided between the oscillation cylinders 5 and 6. There are pressure hoses in order that the crawlers 1 and 2 and the oscillation cylinders 5 and 6 could move with respect to the body. The hydraulic lines 14 and 15 between the cylinders 5 and 6 are connected so that when the length of one cylinder decreases, the length of the other cylinder increases, and vice versa, when an oscillation selector valve 16 is in a position shown in the figure, and control pressure is applied to the locking valves 10a, 10b and 11a, 11b through the control lines 12 and 13. In another embodiment, the control lines 12 and 13 are further provided with control valves 17, 18, through which control pressure can be applied from a control pressure line 19 to the locking valves 10a, 10b and 11a, 11b. The arrangement further comprises a pressure gauge 21 connected to both of the hydraulic lines 14 and 15 of the oscillation cylinders via a shuttle valve 20. The pressure gauge 21 senses pressure prevailing in the lines 14 and 15. In practice, the lines 14 and 15 are hoses which may be damaged when the equipment is used. Thus, when the hose is damaged, the hydraulic pressure prevailing in the line formed by it drops, and the pressure gauge 21 detects the pressure drop. The pressure gauge 21 in turn is most advantageously connected electrically to control the control valves 17 and 18, which are forced downwards in the figure, if the hose is damaged, so that the pressure of the control lines 12 and 13 is discharged into a tank for pressure fluid, and so the locking valves 10a, 10b and 11a, 11b are displaced to a closed position, thus locking the oscillation cylinders 5 and 6 in their current position. As a result of this, the equipment will not fall over in spite of the hose damage.

FIG. 3 shows the oscillation selector valve 16 in a free oscillation position, whereby the rest of the hydraulics is separated from the oscillation cylinders. If the body 4 is to be slanted with respect to the crawlers 1 and 2 in some direction, e.g. when the body 4 should be positioned horizontally during drilling to facilitate the drilling mathematics and the control of the drilling process, the oscillation selector valve can be displaced from the position shown in the figure in either direction, so that both of the oscillation cylinders are contracted or extended in the same direction. If required, it is also possible to displace one crawler independently of the other e.g. by means of separate cylinder-specific electric switches positioned between the pressure gauge 21 and the valves 17 and 18. Furthermore, a shuttle valve 25 connected to hydraulic lines 23 and 24 for a drive control valve 22 of drive motors not shown in the figures is connected to the control pressure line 19 of the control valves 17 and 18. A hydraulic line from the shuttle valve 25 in turn is connected to the control pressure line 19 of the control valves 17 and 18 by another shuttle valve 26, to the other side of which a control pressure line 27 from the oscillation selector valve is connected. As a consequence, control pressure acting in either direction is able to guide the locking valve to the open position to allow operation. In this way the body 4 can be adjusted with respect to the crawlers by the use of the oscillation selector valve, whereby the locking valves 10a, 10b and 11a, 11b open when the oscillation selector valve is operated by a pressure applied to either one of the lines. Correspondingly, when the equipment is driven onwards, the pressure prevailing in either one of the lines 23 or 24 to the drive motor opens the locking valves 10a, 10b and 11a, 11b, and so oscillation is possible during drive. It is further possible to connect a separate regulating valve 28 to the control pressure line 19, and the oscillation can be switched off permanently by the use of the regulating valve in certain conditions, or by electrically controlling the valves 17 and 18 directly. The figure further shows schematically a pump 29 for pressure fluid, by means of which pressure fluid is introduced into the entire hydraulic system. This, however, is a prior art technique, which will not be described more fully herein.

Figure 4A:
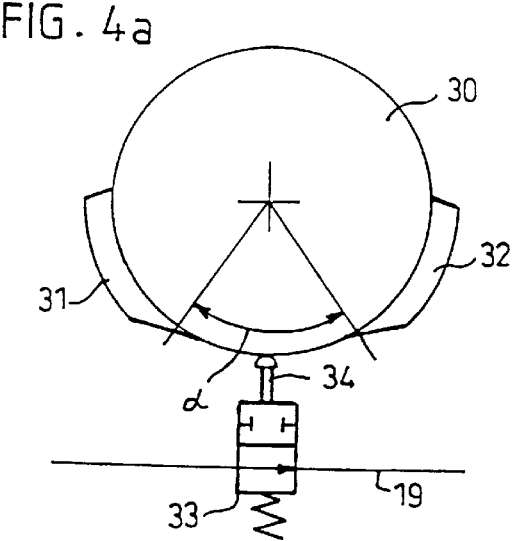
FIGS. 4a and 4b show one embodiment for switching off oscillation based on the turning angle of the boom or the upper carriage.
Figure 4B:
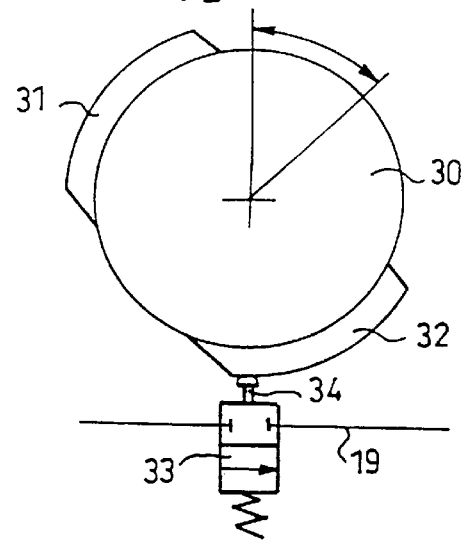

FIGS. 4a to 4b show an embodiment where guide projections 31 and 32 are mounted to the shaft of the boom, or in an arrangement where the upper carriage of the drilling equipment is pivotable, to its vertical shaft 30, and a closing valve 33 is provided beside the shaft 30, a tip 34 of the spindle of the closing valve being arranged to be guided by the control projections 31 and 32. When the shaft turns through an angle wider than an angle a indicated in the figure, as shown in FIG. 4b, the guide projection 31, or 32 in the case of the figure, pushes the spindle of the closing valve 33 inwards, whereby it stops the supply of pressure fluid into the control pressure line 19, and the locking valves 10a, 10b and 11a, 11b are closed, thus preventing the oscillation and the falling of the equipment when the balance changes. Sensing the turning angle based on mechanical operation and closing the valve may also be realized by various limit switches or inductively or in another way of sensing known per se by the use of an electric or hydraulic control. The closing valve 33 may replace the regulating valve 28 shown in FIG. 3 or be positioned in series with it so that the turning of the boom or the upper carriage about its vertical shaft 30 always locks the oscillation cylinders irrespective of the position of the regulating valve. Alternatively, an electric sensor may control the valves 17 and 18 directly.

Figure 5:
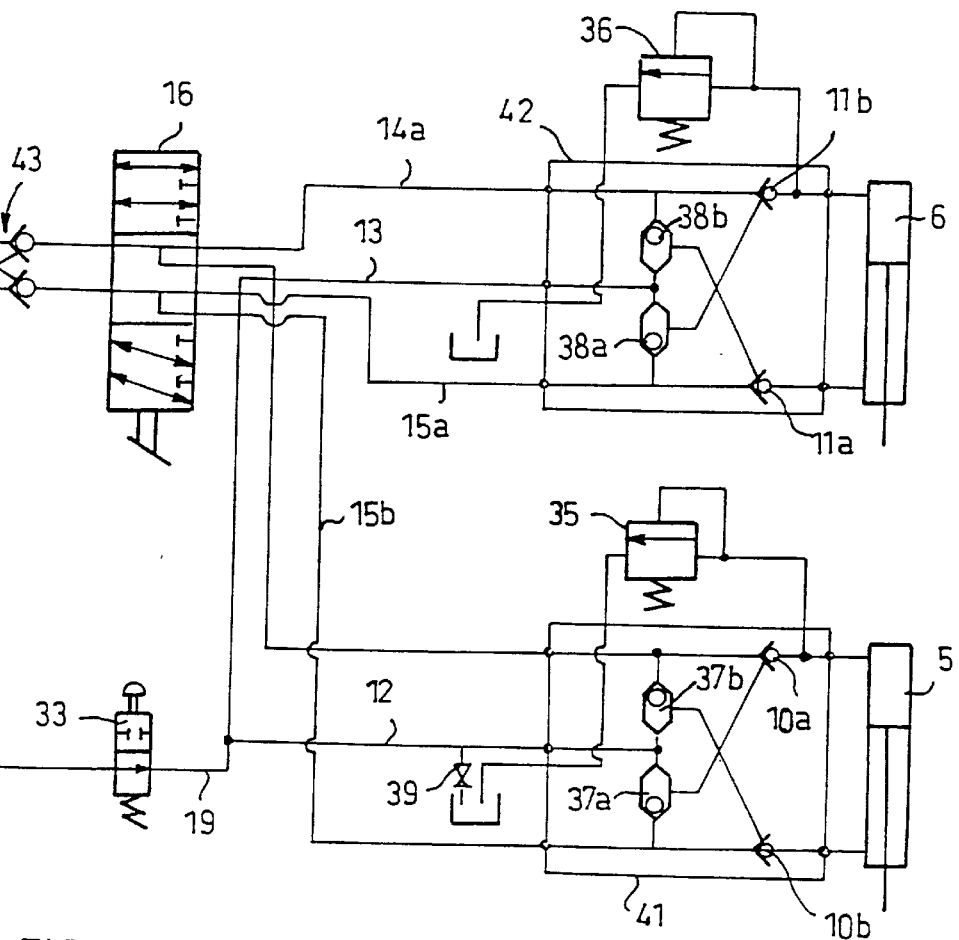
FIG. 5 is a schematic view of another embodiment of the arrangement according to the invention.

FIG. 5 shows schematically an embodiment of the invention, whereby the same reference numerals as in FIG. 3 have been used for the same components. The figure shows the same components as in FIG. 3 except that it further shows additional pressure limit switches 35 and 36, which are not always necessary and which protect the oscillation cylinders 5 and 6 and the locking valves 10a, 10b and 11a, 11b from excessive pressure peaks e.g. when the crawler of the drilling equipment suddenly drops due to a threshold or a hole or the like when the equipment is in motion. In the figure the pressure limit switching arrangement 35, 36 is made only to one of the hydraulic lines, but it is also possible to switch such an arrangement to both hydraulic lines. The figure also shows shuttle valve 37a, 37b and 38a, 38b, the purpose of which is to allow the opening of the locking valves 10a, 10b and 11a, 11b when pressure fluid is applied to either one or both of the cylinders so as to adjust the position of the body of the equipment e.g to a horizontal position in a slanting drilling site. These valves allow the pressure entering one of the hydraulic lines to open also the locking valve of the opposite line, thus allowing the flow of fluid out of the cylinder. The figure further shows a throttle 39, which allows the discharge of the control pressure into the tank when control pressure is relieved from the pressure line 19, thus also allowing the locking valves 10a, 10b and 11a, 11b to close. In this embodiment the locking valves 10a, 10b and 11a, 11b, the shuttle valves 37a, 37b, and the throttle 39 form an integral whole, i.e. a valve block 41. Similarly, the corresponding components for the other oscillation cylinder 6 form a valve block 42. The entity will thus be extremely operative, and this type of valve block may be mounted to the side of the oscillation cylinder or be integral with it. Essential is that the oscillation cylinder and the associated valve block or associated valves have no damageable hose for pressure fluid, but all lines are fixed or fixedly mounted rigid pipes protected in the best possible way. The figure further shows shuttle valves 43, which close the hydraulic lines to the oscillation selector valve 16 when no pressure fluid is being supplied to the cylinders. The pressure fluid is thus not able to escape from the circuit of the oscillation cylinders 5 and 6, but the circuit remains closed. The structure and operation of the shuttle valves 43 are well-known and obvious to one skilled in the art, and therefore will not be described more closely.

The invention has been described above and shown in the drawings only by way of example and it is in no way limited to the examples. The locking valves may be mounted either fixedly to the oscillation cylinders or to the side of the cylinders as separate valves or, as shown in FIG. 5, as valve blocks. Control pressure for the locking valves may be taken automatically from an operative hydraulic line of the drive motor or from some other pressure source if separate oscillation is needed for some reason. Similarly, control pressure for the closing valves may be switched off for various reasons, e.g. when the boom or the upper carriage turns excessively from the point of view of safety.

We claim:

1. In rock drilling equipment which includes a pair of crawlers and a body, an arrangement for controlling oscillation of said equipment in a manner sufficient to prevent tipping over of said equipment, the arrangement comprising oscillation cylinders acting between the body and said pair of crawlers, respectively; an oscillation selector valve allowing said oscillation cylinders to be interconnected during driving of the equipment so that when one of said cylinders is extended, the other of said cylinders is contracted, and vice versa; locking valves mounted in said oscillation cylinders, said locking valves being connected to hydraulic lines for said oscillation cylinders such that flow of pressure fluid out of said oscillation cylinders through the hydraulic lines is normally blocked, and wherein said locking valves each include a separate control line for applying control pressure to said locking valves to release the flow of pressure fluid in the hydraulic lines of said oscillation cylinders.

2. In rock drilling equipment which includes a pair of crawlers and a body, an arrangement for controlling oscillation of said equipment in a manner sufficient to prevent tipping over of said equipment, the arrangement comprising oscillation cylinders acting between the body and said pair of crawlers, respectively; an oscillation selector valve allowing said oscillation cylinders to be interconnected during driving of the equipment so that when one of said cylinders is extended, the other of said cylinders is contracted, and vice versa; locking valves mounted in said oscillation cylinders, said locking valves being connected to hydraulic lines for said oscillation cylinders such that flow of pressure fluid out of said oscillation cylinders through the hydraulic lines is normally blocked, and wherein said locking valves each include a separate control line for applying control pressure to said locking valves to release the flow of pressure fluid in the hydraulic lines of said oscillation cylinders, wherein said locking valves further include shuttle valves mounted between said separate control lines and said hydraulic lines between said oscillation cylinders, which shuttle valves are connected such that pressure prevailing in one of said hydraulic lines and said separate control lines is able to open said locking valves.

3. The arrangement according to claim 2, characterized in further comprising a throttle communicating with another control pressure line of said oscillation cylinders and a pressure fluid tank, whereby when pressure in said another control pressure line is relieved, control pressure of said locking valves is able to escape through said throttle, and the locking valves are closed.

4. The arrangement according to claim 2, wherein said shuttle valves and respective locking valves are connected together into an integral valve block.

5. In rock drilling equipment which includes a pair of crawlers and a body, an arrangement for controlling oscillation, comprising oscillation cylinders acting between the body and said pair of crawlers, respectively; an oscillation selector valve allowing said oscillation cylinders to be interconnected during driving of the equipment so that when one of said cylinders is extended, the other of said cylinders is contracted, and vice versa; locking valves mounted in said oscillation cylinders, said locking valves being connected to hydraulic lines for said oscillation cylinders such that flow of pressure fluid out of said oscillation cylinders through the hydraulic lines is normally blocked, and wherein said locking valves each include a separate control line for applying control pressure to said locking valves to release the flow of pressure fluid in the hydraulic lines of said oscillation cylinders, and further comprising a pressure gauge arranged to sense pressure in each one of said hydraulic lines between said oscillation cylinders; and further wherein another control pressure line to said locking valves is provided with at least one control valve arranged to close said another control pressure line under guidance of said pressure gauge in such a way that said locking valves close said hydraulic lines.

6. The arrangement according to claim 5, wherein each of said control lines of said locking valves for said oscillation cylinders has its own control valve and further wherein said locking valves and respective control valves are connected together into an integral valve block in connection with respective ones of said oscillation cylinders.

7. The arrangement according to claim 5, wherein said pressure gauge is arranged to control said control valves electrically.

8. In rock drilling equipment which includes a pair of crawlers and a body, an arrangement for controlling oscillation, comprising oscillation cylinders acting between the body and said pair of crawlers, respectively; an oscillation selector valve allowing said oscillation cylinders to be interconnected during driving of the equipment so that when one of said cylinders is extended, the other of said cylinders is contracted, and vice versa; locking valves mounted in said oscillation cylinders, said locking valves being connected to hydraulic lines for said oscillation cylinders such that flow of pressure fluid out of said oscillation cylinders through the hydraulic lines is normally blocked, and wherein said locking valves each include a separate control line for applying control pressure to said locking valves to release the flow of pressure fluid in the hydraulic lines of said oscillation cylinders, and further comprising pressure limit switches connected between cylinder spaces in said oscillation cylinders and said hydraulic lines between said oscillation cylinders such that pressure peaks exceeding a predetermined level allow flow of pressure fluid from cylinder spaces into said hydraulic lines.

9. The arrangement according to claim 8, wherein said locking valves are connected to said cylinder spaces of said oscillation cylinders by rigid pipes or fixed lines.

* * * * *